Nov. 13, 1962     M. A. RICKARDS     3,063,663

ARTIFICIAL DAMPING SYSTEM

Filed Aug. 12, 1960

*INVENTOR.*
MICHAEL A. RICKARDS

BY *Lyon & Lyon*

ATTORNEYS

United States Patent Office 3,063,663
Patented Nov. 13, 1962

3,063,663
ARTIFICIAL DAMPING SYSTEM
Michael A. Rickards, Burbank, Calif., assignor to Weber Aircraft Corporation, Burbank, Calif., a corporation of California
Filed Aug. 12, 1960, Ser. No. 49,202
10 Claims. (Cl. 244—78)

The present invention relates to an artificial damping means for effectively and quickly stopping any undesired tumbling or rotation of a body in space. Briefly, the system disclosed herein involves a novel application of Coriolis acceleration applied to a mass, as a force, to effect a practical and controllable damping for a body requiring stabilization in outer space, i.e. where there is no viscous medium such as air.

In maneuvering a space vehicle, it may become necessary to move a man about in space in the vicinity of the vehicle or to another space vehicle. Since outer space affords only a non-viscous environment with no ambient atmosphere, viscous damping is not available to restrain the movement of a body in space, thereby making stabilization extremely difficult to accomplish. Some damping is useful and necessary to retard the tumbling rate of an escape capsule which may be launched from a space vehicle so that a human passenger in the escape capsule may withstand tolerable accelerations.

Although as of the present writing no manned space vehicle has yet been available for a practical test, the disclosed invention has nevertheless been reduced to a calculated practice by an electronic analog computer. It is believed that such computer results are capable of yielding as good indications as may later be had with actual physical embodiments.

In accordance with an important aspect of the present invention, effective artificial damping is provided about mutually perpendicular axes when and as a rotational moment is present and established angular velocity may be stopped by automatic production of an equal and oppositely directed damping torque. The body in space is damped in rotation by a moment which is developed and which is opposite in direction to the angular velocity of the body. The magnitude of the damping moment is made dependent upon the rate of decrease of the angular velocity about two, and preferably three, reference axes.

The invention involves what is termed as "Coriolis acceleration" and is explained in textbooks such as "Mechanics" by J. P. Hartog (McGraw-Hill Book Co., 1948) in chapter 16, and "The Elements of Mechanics" by W. S. Franklin and Barry MacNutt (The MacMillan Company, 1907), page 151. In general, Coriolis acceleration is in a direction which is perpendicular to the velocity of a particular point concerned, within a rotating reference frame. When a frame is thus designated by the usual X, Y and Z axes, the components of Coriolis acceleration for rotation about the Z axis in the positive sense may be expressed as follows:

$$C_X = 2\omega V_Y$$
$$C_Y = 2\omega V_X$$
$$C_Z = 0$$

where $C_X$, $C_Y$ and $C_Z$ are the Coriolis acceleration components in the X, Y and Z directions respectively; $\omega$ is the angular velocity about the Z axis; and $V_X$, $V_Y$ and $V_Z$ represent the velocity of the point concerned along the designated directions X, Y and Z.

Typical examples in which Coriolis acceleration effects manifest themselves are indicated in the following two examples. A freely falling body, as it approaches the earth, is caused to deviate eastward from a plumbline reference; and a train running due northward on a horizontal track with a velocity $v$, at a fixed latitude $\lambda$, exerts a Coriolis reaction force eastward against the train's track of magnitude $2\omega \sin \lambda$. Of course, Coriolis acceleration effects are not only present due to rotation of the earth but manifest themselves where any rotation in space occurs.

It is therefore a general object of the present invention to provide a damping system for a body using Coriolis acceleraion applied to a mass as a force to achieve a practical and controllable damping means for a body requiring stabilization in a non-viscous environment.

Another object of the present invention is to provide a system of this character which is small and effective for these purposes.

Another object of the present invention is to provide a system of this character which is automatic in its operation.

Another object of the present invention is to provide a system of this character involving the use of a pair of air ducts, one of which is automatically movable with respect to the other to provide an air stream automatically directed to counteract rotational motion.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 1, 2:
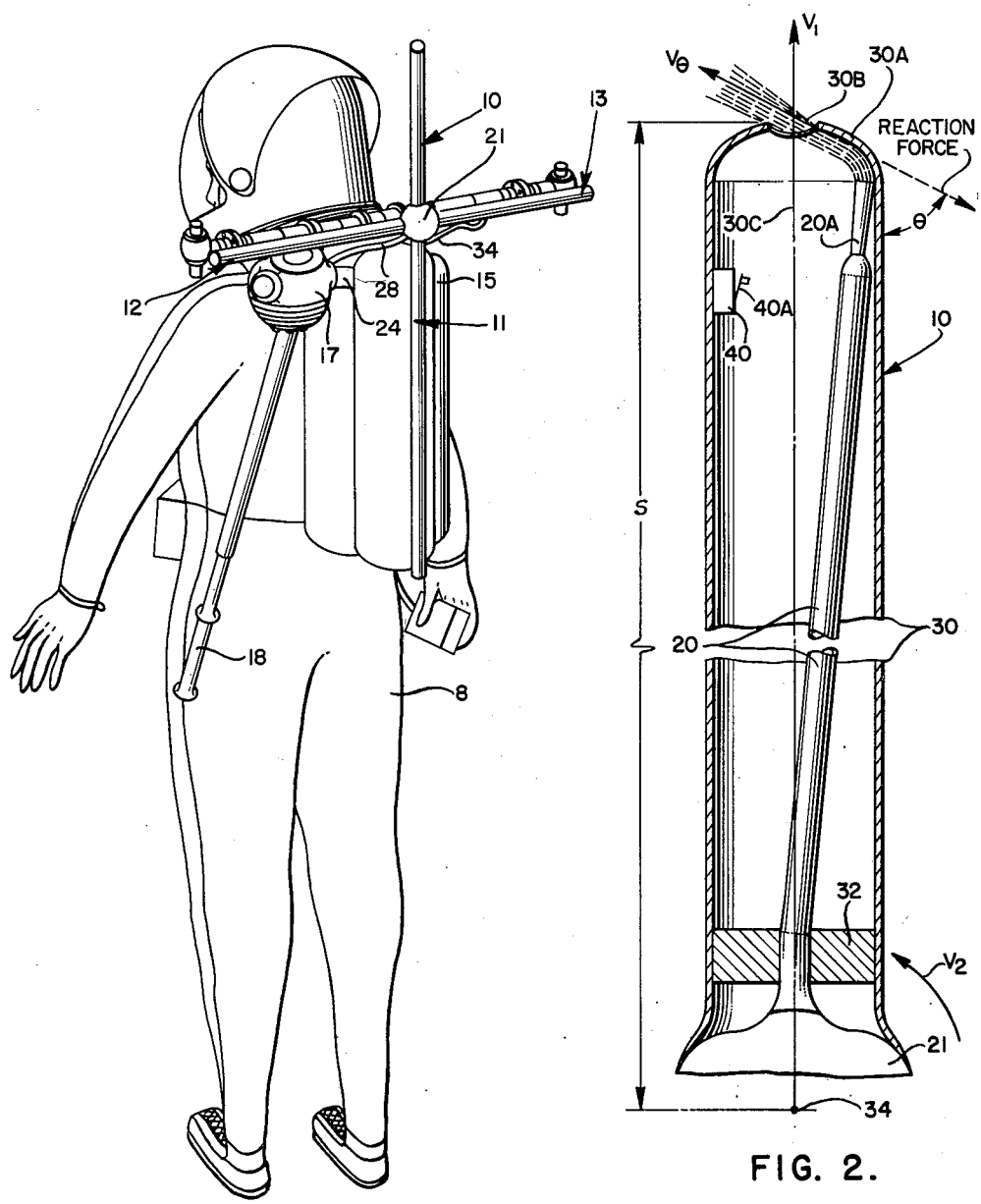
FIGURE 1 illustrates a spaceman wearing a damping system in accordance with features of the present invention.
FIGURE 2 illustrates a section through one of the tube sets incorporated in the system shown in FIGURE 1.

Referring to the drawings, the stabilizing system involves the use of a plurality of tube sets shown at 10, 11, 12 and 13, one of which, namely tube set 10, is illustrated in detail in FIGURE 2. While the system is shown as being worn by a person, the same may be mounted on any other body which is to be stabilized against tumbling or rotational effects. The invention, however, will be described with reference to wearing of the system by a person.

Each of the tube sets may be supplied with compressed gas or the equivalent, normally stored in the tank 15 which is strapped on the back of the person together with all of the other apparatus described here. The flow of compressed gas from the tank 15 to each of the tube sets 10, 11, 12 and 13 may be controlled manually by a valve 17 which in turn may be suitably opened and closed by the valve-actuating member 18 in the form of a handle within easy access of the person's hand; or alternatively, as described later, the flow of compressed gas from the tank 15 may be automatically controlled in response to acceleration forces developed on the inner tube 20 of the tube sets.

Suitable conduit means are provided for conducting the compressed air from tank 15 to a manifold 21 to which each of the tube sets 10, 11, 12 and 13 is connected. As illustrated, such conduits include the conduit 24 extending from tank 15 to the valve 17 and conduit 28 extending from the outlet of valve 17 to the manifold 21. In such conduits the pressure reducers may be incorporated so that the tank 15 may be filled with gas at a pressure of, for example, 3,000 pounds per square inch.

Each of the tube sets is constructed as shown in FIGURE 2 and the same includes an outer rigid tube 30 connected at one end to the manifold 21, the other end of tube 30 being rounded at 30A and being provided with an apertured portion 30B. The inner tube 20 is in the nature of a resilient reed and has one of its ends supported in a bushing 32, the other end of flexible tube 20 being provided with a convergent-divergent nozzle portion 20A. The mounting is such that gas flowing from the manifold 21 may escape only through tube 20. In the normal position of tube 20, its axis corresponds to the axis of the outer tube 30, i.e. the center line 30C, so that a jet of gas escaping from tube 20 passes directly out of the apertured portion 30B without impingement on tube 30.

FIGURE 2 illustrates the position of the inner tube 20 when Coriolis acceleration forces act thereon in response to a rotational velocity $V_2$ about the center 34 of manifold 21, which center 34 is also the center of dynamic rotation of the body, the apparatus being mounted so that, indeed, the dynamic center of rotation of the body corresponds to the point 34. Thus, when there is no angular velocity, i.e. the body is not rotating, the axis of tube 20 corresponds to the axis of tube 30 but when there is rotation, as exemplified by counterclockwise rotation at a velocity $V_2$, the tube 20 is automatically deflected to the position shown in FIGURE 2, by the action of Coriolis acceleration forces.

In the latter case the gas emitted from tube 20 impinges on the curved end 30A of the tube 30 and passes through the apertured portion 30B with a velocity represented by $V_0$. Thus, the direction of exit velocity shifts from the direction indicated at $V_1$ at no deflection to $V_0$ at an angle designated as $\theta$, thereby developing a force value of $Fx \sin \theta$, so as to react upon a moment arm S about the body's rotation center 34, and in opposition to the angular velocity indicated by $V_2$ for the outer duct 30 and the body 8 which carries it.

To be effective for the intended damping of a body in space, the damping system should be capable of applying very quick opposition to angular velocity and in adequate amount to oppose the value of velocity $V_2$. The end of tube 30 may be shaped so as to be spherical or curved to correctly deflect the gas stream that ejects through the orifice 30B. By these means the effects of angular velocity are overcome automatically in that the inner end 30A of tube 30 suitably directs the ejected gas in the required opposing direction.

While it is preferred to use four tube sets 10, 11, 12 and 13 as shown in FIGURE 1, in some cases two tube sets at right angles to each other may be used to dampen the rotation of the body about any reference axis. Preferably, instead of two, four tube sets are used as shown in FIGURE 1 so that the required length of the moment arm for any one particular tube may be reduced by one-half. In other systems three tube sets may be used, each mounted mutually perpendicular to each other along generally an X-axis, Y-axis and Z-axis.

Thus, in the system described a Coriolis acceleration applied to a mass sets up a force and this force acts upon an arm that is free to rotate and a force reaction is developed to provide a moment which applies a correcting or compensating force. This establishes rotational damping.

While the tube sets are preferably of circular tubular stock, any other suitable cross-sectional shape may be used.

In order to conserve the supply of air, the operation of the system may be such that air is delivered only when sufficient operating force acts upon the flexible tube 20 to deflect tube 20 a predetermined amount from its normal central position. For this latter purpose a series of switches 40, requiring small actuating force, are mounted circumferentially within the tube 30 so that one of the switch-actuating members 40A is contacted by the tube 20 when the same is deflected a predetermined distance from its central position. Each one of these switches 40 in conventional manner may be used, when actuated, to initiate the flow of air through tube 20. For this latter purpose the switches 40 may have their contacts connected in parallel to control the operation of, for example, a solenoid air valve controlling the flow of air to the manifold 21.

A typical application of the system is one in which a 200-pound man is equipped with this apparatus embodying the system to present a total moment of inertia value of 15 slug-feet$^2$. The air in container 15 may be at 3,000 pounds per square inch. Each tube 20 has its open end provided with a converging-diverging nozzle 20A of one to two dynamic ratio. Mutually perpendicular duct sets may extend from the body so that the exit gas may apply 10 pounds of thrust at a variable angle to a moment arm of 4-feet length. Analog computer results show that, starting with an initial rotational rate of two radians per second, the artificial damping provided by the system reduces this rate within 1⅛ seconds to a tolerable value of less than 0.44 radians per second.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. A rotational damping device for a body in angular motion comprising, a pair of ducts, means supporting one of said ducts in the other of said ducts as a cantilever which is deflectable when subjected to a Coriolis reaction force, means supplying pressurized gas to said one duct, said other duct having an apertured portion which is aligned with the free end of said one duct when there is no Coriolis reaction force, and said other duct having a portion in the path of the gas stream emitted from said one duct when there is a Coriolis reaction force to produce a force opposing rotation of said body.

2. A rotational damping device for a body in angular motion comprising, a pair of ducts, means supporting one of said ducts as a cantilever deflectable within the other duct when said one duct is subjected to a Coriolis reaction force, a source of pressurized gas, and connecting means connecting said source to said one duct, said other duct having a portion in the path of the gas stream from said one duct for developing a force opposing the rotation of said body.

3. A device as set forth in claim 2 wherein said one duct is a flexible tube normally coaxial with the other duct and said other duct having an apertured portion aligned with said one duct in the absence of a Coriolis reaction force.

4. A device as set forth in claim 2 wherein said other duct defines a shaped exit tip for varying the angle at which the gas is ejected through said other tube in an amount dependent on the deflection of said one duct.

5. An arrangement as set forth in claim 2 in which a plurality of pairs of said ducts extend perpendicular to each other.

6. An arrangement as set forth in claim 2 in which three pairs of said ducts are disposed mutually perpendicular to each other.

7. An arrangement as set forth in claim 2 wherein said pair of ducts comprises tubes, one of which defines a shaped exit nozzle cooperating to deflect ejected gas against a shaped deflected surface on the end of the other.

8. An arrangement as set forth in claim 2 wherein the inner duct terminates in an exit nozzle that cooperates with a shaped exit surface of the outer duct to direct a gas stream at an angle dependent on the deflection of said inner duct.

9. An arrangement as set forth in claim 2 in which said connecting means includes a valve.

10. An arrangement as set forth in claim 9 wherein means are provided for automatically controlling said valve in accordance wtih deflection of said inner duct.

References Cited in the file of this patent

UNITED STATES PATENTS

| | | |
|---|---|---|
| 1,967,156 | Moller | July 17, 1934 |
| 2,364,128 | Carlson | Dec. 5, 1944 |

FOREIGN PATENTS

| | | |
|---|---|---|
| 667,816 | Germany | Nov. 21, 1935 |
| 817,435 | France | May 24, 1937 |